(12) United States Patent
Zhao et al.

(10) Patent No.: US 10,438,464 B1
(45) Date of Patent: Oct. 8, 2019

(54) SYSTEMS AND METHODS FOR DETERMINING AND VERIFYING A PRESENCE OF AN OBJECT OR AN INTRUDER IN A SECURED AREA

(71) Applicant: Honeywell International Inc., Morristown, NJ (US)

(72) Inventors: Tianfeng Zhao, Shenzhen (CN); Xiaomin Xia, Shenzhen (CN); Guang Liu, Shenzhen (CN)

(73) Assignee: ADEMCO INC., Golden Valley, MN (US)

( * ) Notice: Subject to any disclaimer, the term of this patent is extended or adjusted under 35 U.S.C. 154(b) by 0 days.

(21) Appl. No.: 16/001,360

(22) Filed: Jun. 6, 2018

(51) Int. Cl.
  *G08B 13/16* (2006.01)
  *G01V 9/00* (2006.01)
  *G08B 29/18* (2006.01)
(52) U.S. Cl.
  CPC ........... *G08B 13/1645* (2013.01); *G01V 9/00* (2013.01); *G08B 29/185* (2013.01)
(58) Field of Classification Search
  CPC .......... G01S 13/56; G01S 13/04; G01S 13/87; G01S 13/878; G01S 13/88; G01S 13/89; G08B 13/2491; G08B 29/26
  See application file for complete search history.

(56) References Cited

U.S. PATENT DOCUMENTS

| 4,191,953 A | 3/1980 | Woode |
| 4,527,151 A | 7/1985 | Byrne |
| 5,331,308 A | 7/1994 | Buccola et al. |
| 5,781,108 A | 7/1998 | Jacob et al. |
| 6,353,385 B1 | 3/2002 | Molini et al. |
| 6,778,092 B2 | 8/2004 | Braune |
| 6,943,685 B2 | 9/2005 | Seo |
| 6,992,577 B2 | 1/2006 | Tsuji et al. |

(Continued)

FOREIGN PATENT DOCUMENTS

| CA | 2 351 138 A1 | 12/2002 |
| EP | 2 260 563 B1 | 10/2011 |
| EP | 3 355 289 A1 | 8/2018 |

OTHER PUBLICATIONS

Extended European search report for related EP patent application 18183507.5, dated Oct. 26, 2018.

(Continued)

*Primary Examiner* — Omeed Alizada
(74) *Attorney, Agent, or Firm* — Husch Blackwell LLP

(57) ABSTRACT

Systems and methods for determining and verifying a presence of an object or an intruder within a secured area are provided. Such systems and methods tan include a microprocessor unit sampling data from a smart microwave sensor module to detect the presence of the object or the intruder, using the data to calculate a velocity of the object or intruder, using the data to calculate a distance between the smart microwave sensor module and the object or the intruder, determining whether the velocity is within a predefined range, and using the distance to determine whether the object or the intruder is within a designated protection territory. Such systems and methods also may include recording trigger positions of the object or the intruder when the velocity is within the predefined range and the distance indicates the object or the intruder is within the designated protection territory.

13 Claims, 4 Drawing Sheets

(56) References Cited

U.S. PATENT DOCUMENTS

| | | |
|---|---|---|
| 7,084,761 B2 | 8/2006 | Izumi et al. |
| 7,274,387 B2 | 9/2007 | Gupta et al. |
| 7,327,253 B2 | 2/2008 | Whitten et al. |
| 7,463,182 B1 | 12/2008 | Morinaga et al. |
| 7,636,039 B2 | 12/2009 | Babich |
| 7,679,509 B2 | 3/2010 | Royer |
| 8,102,261 B2 | 1/2012 | Wu |
| 8,432,448 B2 | 4/2013 | Hassapis et al. |
| 8,519,883 B2 | 8/2013 | Drake et al. |
| 9,125,144 B1 | 9/2015 | Orbach et al. |
| 9,189,751 B2 | 11/2015 | Matsuoka et al. |
| 9,237,315 B2 | 1/2016 | Naylor et al. |
| 9,498,885 B2 | 11/2016 | Scott et al. |
| 9,655,217 B2 | 5/2017 | Recker et al. |
| 2003/0030557 A1 | 2/2003 | Progovac et al. |
| 2006/0139164 A1 | 6/2006 | Tsuji |
| 2007/0018106 A1* | 1/2007 | Zhevelev ............... G01J 5/08 250/353 |
| 2007/0115164 A1 | 5/2007 | Wu et al. |
| 2007/0176765 A1 | 8/2007 | Babich et al. |
| 2007/0252720 A1 | 11/2007 | Hughes et al. |
| 2007/0253461 A1 | 11/2007 | Billington et al. |
| 2008/0100498 A1 | 5/2008 | Fullerton et al. |
| 2008/0218339 A1 | 9/2008 | Royer |
| 2008/0218340 A1 | 9/2008 | Royer |
| 2009/0051529 A1 | 2/2009 | Tsuji |
| 2009/0079563 A1* | 3/2009 | Tsuji ...................... G01S 13/04 340/552 |
| 2010/0013636 A1 | 1/2010 | Wu |
| 2010/0201527 A1 | 8/2010 | Jensen et al. |
| 2013/0300566 A1 | 11/2013 | Kumfer et al. |
| 2015/0212205 A1 | 7/2015 | Shpater |
| 2015/0369618 A1 | 12/2015 | Barnard et al. |
| 2016/0226892 A1 | 8/2016 | Sen et al. |

OTHER PUBLICATIONS

Extended European search report for related EP patent application 18153319.1, dated May 8, 2018.
Office action for related CA patent application 2,992,039, dated Sep. 25, 2018.
T.K. Hareendran, HB100 Microwave Motion Sensor—An Introduction, Electro Schematics, © 2017.
United States Nuclear Regulatory Commission, Office of Nuclear Security and Incident Response, Intrusion Detection Systems and Subsystems, Technical Information for NRC Licensees, Published Mar. 2011.
Essential Video Analytics 6.30, @ Bosch Security Systems 2017, V3, Feb. 16, 2017, www.boschsecurity.com.
Intrusion Detection Systems and Subsystems, United States Nuclear Regulatory Commission, Published: Mar. 2011.

* cited by examiner

SYSTEMS AND METHODS FOR DETERMINING AND VERIFYING A PRESENCE OF AN OBJECT OR AN INTRUDER IN A SECURED AREA

FIELD

The present invention relates generally to security systems. More particularly, the present invention relates to systems and methods for monitoring a secured area and determining and verifying a presence of an object or an intruder within the secured area.

BACKGROUND

Known systems and methods for monitoring a secured area are susceptible to false alarms and failure to detect a presence of a hostile object or an intruder. For example, such known systems and methods may be falsely activated by hot air, a distant train, a flash of light, or the like while failing to verify the presence of the object or the intruder within the secured area.

In view of the above, there is a continuing, ongoing need for improved systems and methods.

DETAILED DESCRIPTION

Figure 1:
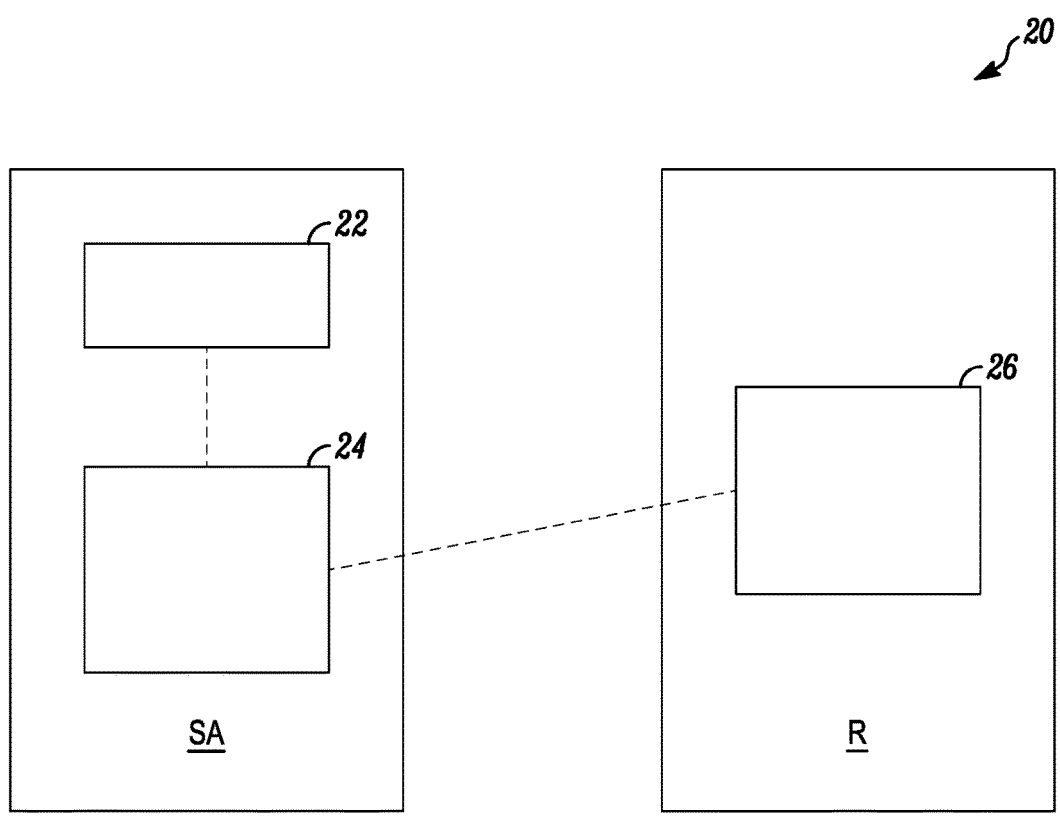
FIG. 1 is a block diagram of a security system in accordance with disclosed embodiments.

While this invention is susceptible of an embodiment in many different forms, there are shown in the drawings and will be described herein in detail specific embodiments thereof with the understanding that the present disclosure is to be considered as an exemplification of the principles of the invention. It is not intended to limit the invention to the specific illustrated embodiments.

Embodiments disclosed herein may include systems and methods for monitoring a secured area and determining and verifying a presence of an object or an intruder within the secured area, for example, by identifying a speed, a position, and a moving direction of the object or the intruder. In some embodiments, systems and methods disclosed herein may include a microprocessor unit sampling data from a smart microwave sensor module to detect the data indicative of the presence of the object or the intruder. Such systems and methods also may record a trigger position of the object or the intruder when (1) a velocity of the object or the intruder (the speed) is within a predefined range and (2) a distance of the object or the intruder relative to the smart microwave sensor module (the position) is within a designated protection territory.

Systems and methods disclosed herein are described in connection with a security system. It is to be understood that such a security system may include, but is not limited to the smart microwave sensor module electrically connected to the microprocessor unit and to a user interface device deployed in the secured area or at a remote location removed from the secured area. However, it is to be understood that systems and method disclosed herein are not so limited and may be used in conjunction with other systems, including security systems with security alarms, home automation systems with automatic toilet controls, automatic faucet controls, or automatic door openers, and vehicle systems with vehicle backup warning systems and collision detection systems.

In accordance with disclosed embodiments, the microprocessor unit may sample first signal data from the smart microwave sensor module to detect the presence of the object or the intruder in the secured area. Using the first signal data, the microprocessor unit may calculate a first velocity of the object or the intruder and a first distance between the smart microwave sensor module and the object or the intruder. For example, in some embodiments, the microprocessor unit can employ known techniques relating to smart microwave Doppler theory with related algorithmic processing to calculate the first velocity and the first distance. Furthermore, the microprocessor unit may determine whether the first velocity is within a predefined range and use the first distance to determine whether the object or the intruder is within a designated protection territory for the smart microwave sensor module. When the first velocity is within the predefined range and the first distance indicates the object or the intruder is within the designated protection territory, the microprocessor unit may record a trigger position of the object or the intruder indicative of the current position of the object or the intruder when the first signal data was sampled.

In some embodiments, the microprocessor unit may sample second signal data from the smart microwave sensor module to detect the presence of the object or the intruder in the secured area. Using the second signal data, the microprocessor unit may calculate a second velocity of the object or the intruder and a second distance between the smart microwave sensor module and the object or the intruder. Furthermore, the microprocessor unit may determine whether the second velocity is within the predefined range and use the second distance to determine whether the object or the intruder is within the designated protection territory for the smart microwave sensor module. When the second velocity is within the predefined range and the second distance indicates the object or the intruder is within the designated protection territory, the microprocessor unit may record a second trigger position of the object or the intruder indicative of the current position of the object or the intruder when the second signal data was sampled.

In some embodiments, the microprocessor unit may generate an intrusion track route between the first trigger position and the second trigger position to identify the moving direction of the object or the intruder and a path for the object or the intruder between the first trigger position and the second trigger position. For example, in some embodiments the intrusion track route can include the path with a shortest distance between the first trigger position and the second trigger position.

In some embodiments, the microprocessor unit can transmit one or more signals indicative of the first trigger position, the second trigger position, and the intrusion track route to the user interface device for displaying a rendering of the first trigger position, the second trigger position, and the intrusion track route thereon. Responsive thereto, the user interface device may receive user input confirming the presence of the object or the intruder. For example, the user interface device may receive the user input may responsive to a user evaluating the rendering of the first trigger position, the second trigger position, and the intrusion track route to determine whether the first trigger position, the second trigger position, and the intrusion track route are indicative of a false alarm or a genuine alarm. In some embodiments, the rendering may be displayed on the user interface device within a window that includes a depiction or a demarcation of the designated protection territory relative to the smart microwave sensor unit.

It is to be understood that the user interface device and the microprocessor unit disclosed herein can include a transceiver device and a memory device, each of which can be in communication with control circuitry, one or more programmable processors, and executable control software as would be understood by one of ordinary skill in the art. In some embodiments, the executable control software can be stored on a transitory or non-transitory computer readable medium, including, but not limited to local computer memory, RAM, optical storage media, magnetic storage media, flash memory, and the like, and some or all of the control circuitry, the programmable processors, and the executable control software can execute and control at least some of the methods disclosed herein.

FIG. 1 is a block diagram of a security system 20 in accordance with disclosed embodiments. As seen in FIG. 1, the security system 20 may include a smart microwave sensor module 22 and a microprocessor unit 24 deployed in a secured area SA. The security system 20 may also include a user interface device 26 deployed in a remote location R that communicates with the microprocessor unit 24.

Figure 2:
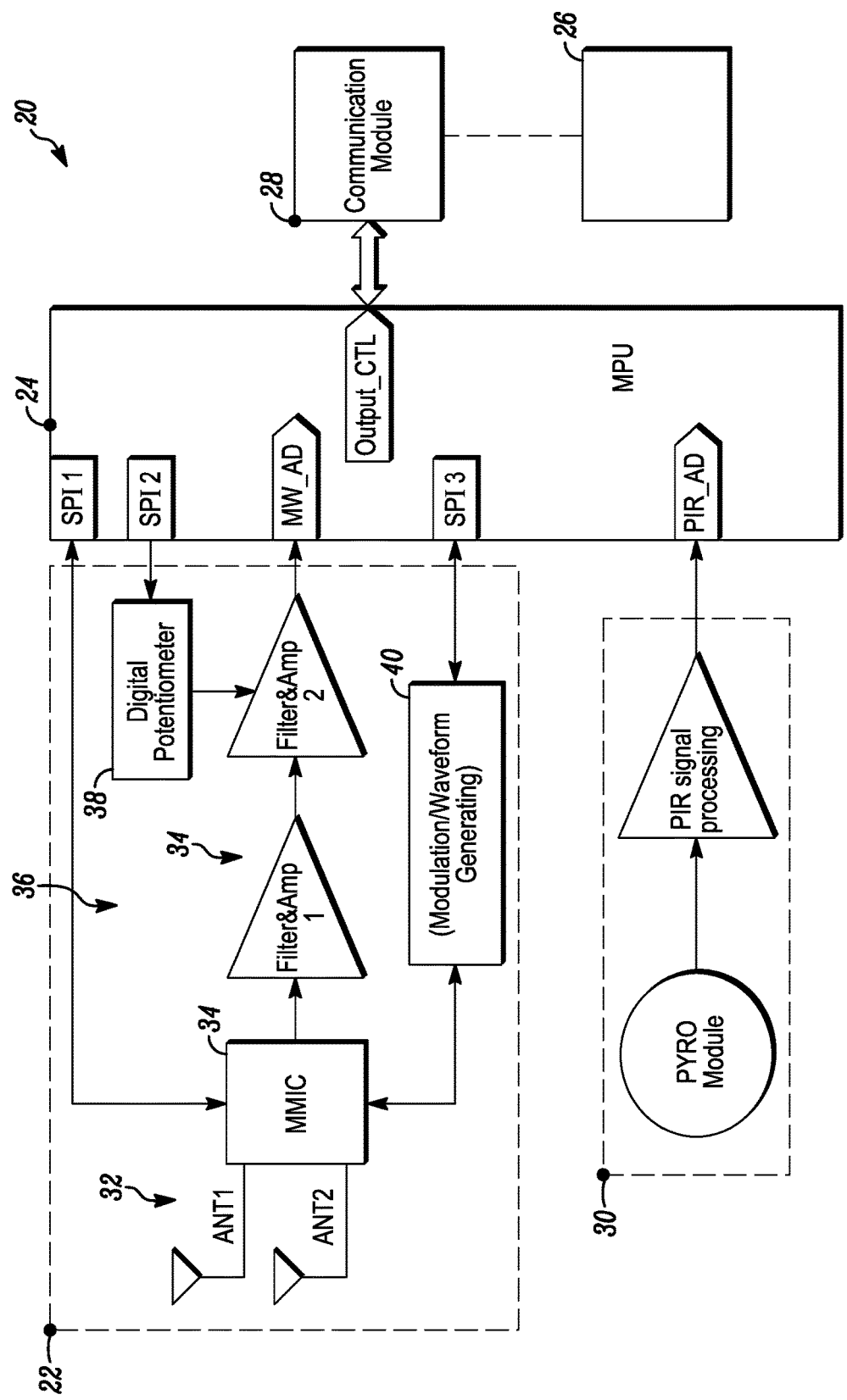
FIG. 2 is a block diagram of components of a security system in accordance with disclosed embodiments.

FIG. 2 is a block diagram of the components of the security system 20. As seen in FIG. 2, the smart microwave sensor module 22 may include transmitting and receiving antennas 32, a Monolithic Microwave Integrated Circuit (MMIC) 34, two-level signal-processing circuits 36, such as filters and amplifiers, a digital potentiometer 38 to adjust a gain of a microwave intermediate frequency signal output from the two-level signal-processing circuits 36, and a modulation/waveform generating module 40. In some embodiments, the microprocessor unit 24 may control the modulation/waveform generating module 40 to transmit a VCO control signal to drive the MMIC 34. Furthermore, in some embodiments, the microprocessor unit 24 may sample the microwave intermediate frequency signal output from the two-level signal-processing circuits 36 to determine whether an object or an intruder is present within the secured area SA.

As seen in FIG. 2, the security system 20 may also include a communication module 28 coupling the microprocessor unit 24 to the user interface device 26. Furthermore, the security system 20 may include a passive infrared (PIR) module 30 that may transmit a wake up signal to one or both of the smart microwave sensor module 22 and the microprocessor unit 24 with instructions to exit a low power sleep state or that, in a dual-tech functionality mode, may transmit PIR data to the microprocessor unit 24 indicative of the presence of the object or the intruder within the secured area SA.

Figure 3:
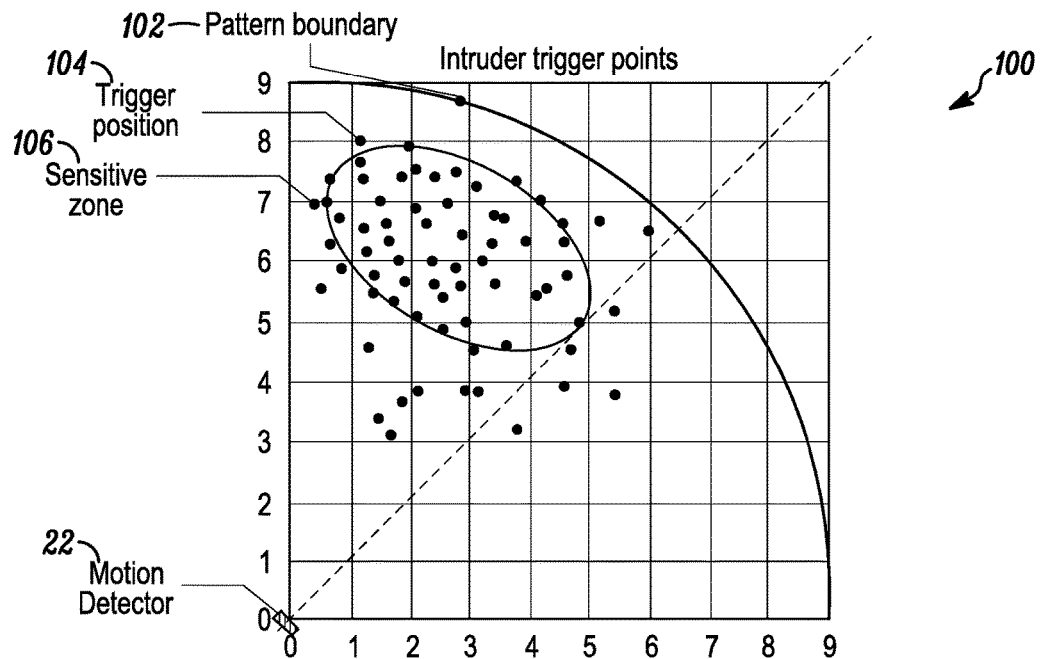
FIG. 3 is a view of a display window in accordance with disclosed embodiments.

FIG. 3 is a view of a display window 100 of the user interface device 26 in accordance with disclosed embodiments. The display window 100 may display a graph identifying a distance from the motion detector 22 in X and Y directions, a demarcation of a pattern boundary 102 on the graph indicative of a limit of a designated projection territory for the smart microwave sensor module 22, and trigger points 104 on the graph indicative of trigger positions at which the presence of the object or the intruder is detected when a velocity of the object or the intruder is within a predefined range and a distance of the object or the intruder relative to the smart microwave sensor module 22 indicates the object or the intruder is within the designated protection territory. In some embodiments, systems and methods disclosed herein can identify a sensitive zone 106 on the graph indicative of a clustering of the trigger points 104, and the sensitive zone 106 can be indicative of a vulnerable area within the designated protection area.

Figure 4:
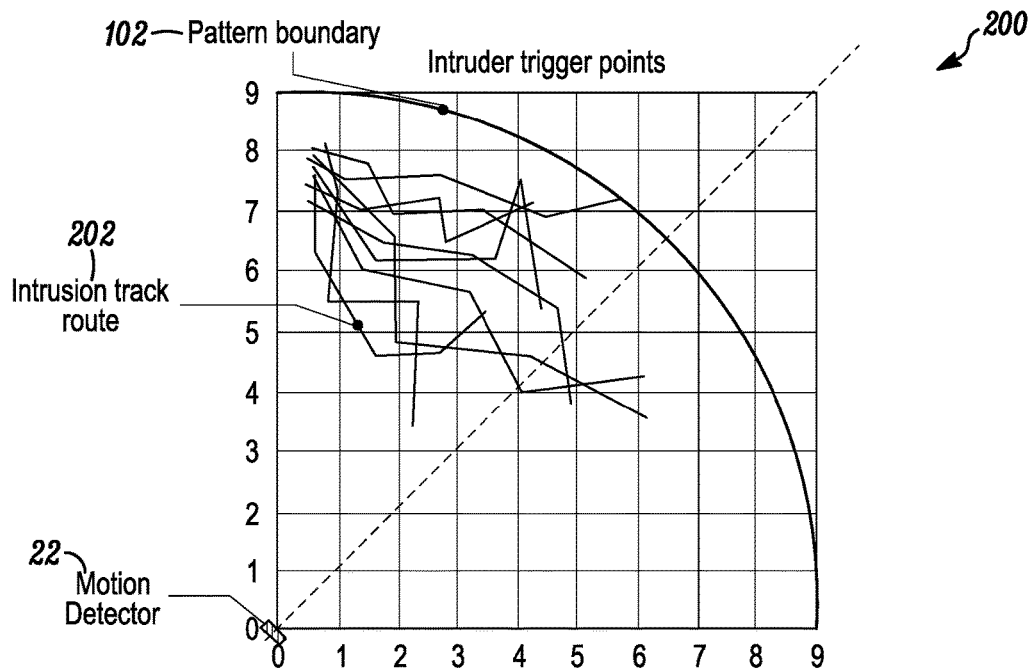
FIG. 4 is a view of a display window in accordance with disclosed embodiments.

FIG. 4 is a view of a display window 200 of the user interface device 26 in accordance with disclosed embodiments. The display window 200 may display the graph identifying the distance from the motion detector 22 in the X and Y directions and a rendering of intrusion track routes 202 connecting the trigger points 104. In some embodiments, a first time at which the object or the intruder is detected at a first of the trigger points 104 may be closest in time to a second time at which the object or the intruder is detected at a second of the trigger points 104 connected to the first of the trigger points 104 via one of the intrusion track routes 202. Furthermore, in some embodiments, the intrusion track routes 202 can be indicative of a moving direction of the object or the intruder, which facilitates verifying the presence of the object or the intruder prior to triggering an alarm and is an improvement from previously known detectors in which any movement triggers an alarm.

Figure 5:
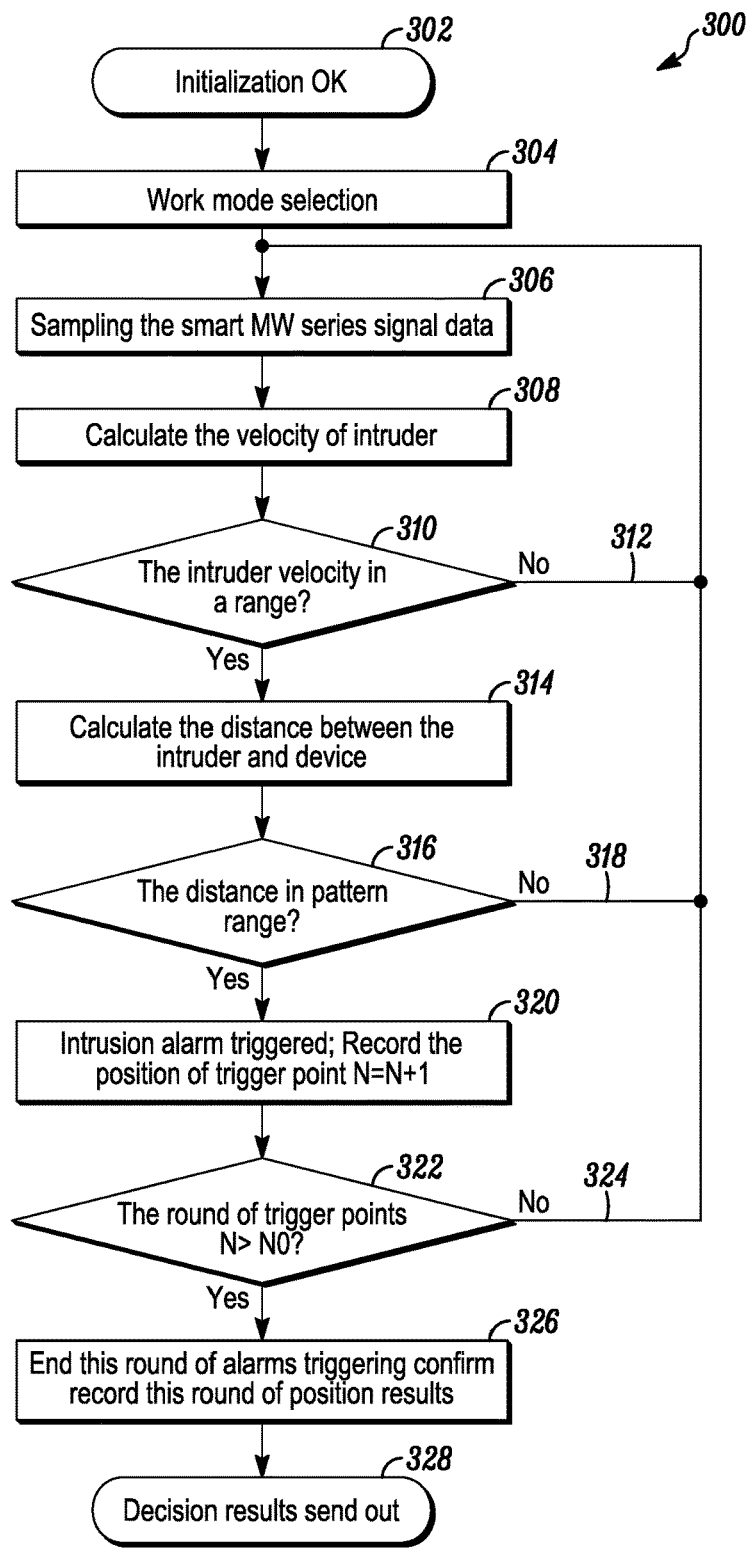
FIG. 5 is a flow diagram of a method in accordance with disclosed embodiments.

FIG. 5 is a flow diagram of a method 300 in accordance with disclosed embodiments. As seen in FIG. 5, the method 300 can include the microprocessor unit 24 verifying an initialization reset, as in 302, and receiving a work mode selection, as in 304. Then, the method 300 can include the microprocessor unit 24 sampling data from the smart microwave sensor module 22 for processing, as in 306, using the data to calculate the velocity of the object or the intruder, as in 308, and determining whether the velocity is within a first range, as in 310.

When the velocity is outside of the first range, the method 300 can include the microprocessor unit 24 continuing to sample the data from the smart microwave sensor module 22, as in 312. However, when the velocity is within the first preset range, the method 300 can include the microprocessor unit 24 can using the data to calculate the distance between the object or the intruder and the smart microwave sensor module 22, as in 314, and determining whether the distance is within a second range, as in 316, that is, within a designated protection territory of the smart microwave sensor module 24.

When the distance is outside of the second range, the method 300 can include the microprocessor unit 24 continuing to sample the data from the smart microwave sensor module 22, as in 318. However, when the distance is within the second range, the method 300 can include the microprocessor unit 24 triggering an intrusion alarm, recording the trigger position of one of the trigger points 104 indicative of a current position of the object or the intruder when the data that triggered the intrusion alarm was sampled, and incrementing a counter, as in 320. Then, the method 300 can include the microprocessor unit 24 determining whether a value of the counter is greater than a preset threshold NO, as in 322.

When the value of the counter is less than the preset threshold NO, the method 300 can include the microprocessor unit 24 continuing to sample the data from the smart microwave sensor module 22, as in 324. However, when the value of the counter is greater than the preset threshold NO, the method 300 can include the microprocessor unit 24 terminating a current round of alarm triggering and recording the trigger points 104 for the current round, including one of the intrusion track routes 202 connecting at least some of the trigger points 104 for the current round, as in 326. Finally, the method 300 can include the microprocessor unit 24 transmitting data related to the trigger points 104 and the intrusion track routes 202 for display on the display window 100, as in 328.

Although a few embodiments have been described in detail above, other modifications are possible. For example, the steps described above do not require the particular order described or sequential order to achieve desirable results. Other steps may be provided, steps may be eliminated from the described flows, and other components may be added to or removed from the described systems. Other embodiments may be within the scope of the invention.

From the foregoing, it will be observed that numerous variations and modifications may be effected without departing from the spirit and scope of the invention. It is to be understood that no limitation with respect to the specific system or method described herein is intended or should be inferred. It is, of course, intended to cover all such modifications as fall within the spirit and scope of the invention.

What is claimed is:

1. A method comprising:
sampling first signal data from a smart microwave sensor module to detect a presence of an object or an intruder;
using the first signal data to calculate a first velocity of the object or the intruder;
using the first signal data to calculate a first distance between the smart microwave sensor module and the object or the intruder;
determining whether the first velocity is within a predefined range;
using the first distance to determine whether the object or the intruder is within a designated protection territory;
when the first velocity is within the predefined range and the first distance indicates the object or the intruder is within the designated protection territory, recording a first trigger position of the object or the intruder indicative of a current position of the object or the intruder when the first signal data was sampled;
sampling second signal data from the smart microwave sensor module to detect the presence of the object or the intruder;
using the second signal data to calculate a second velocity of the object or the intruder;
using the second signal data to calculate a second distance between the smart microwave sensor module and the object or the intruder;
determining whether the second velocity is within the predefined range;
using the second distance to determine whether the object or the intruder is within the designated protection territory;
when the second velocity is within the predefined range and the second distance indicates the object or the intruder is within the designated protection territory, recording a second trigger position of the object or the intruder indicative of the current position of the object or the intruder when the second signal data was sampled; and
generating an intrusion track route between the first trigger position and the second trigger position to identify a path for the object or the intruder between the first trigger position and the second trigger position.

2. The method of claim 1 further comprising displaying a rendering of the first trigger position, the second trigger position, and the intrusion track route on a user interface device.

3. The method of claim 2 further comprising receiving user input confirming the presence of the object or the intruder.

4. The method of claim 2 further comprising displaying the rendering within a window on the user interface device depicting the designated protection territory.

5. The method of claim 1 further comprising:
receiving a work mode selection; and
responsive to receiving the work mode selection, sampling the first signal data from the smart microwave sensor module to detect the presence of the object or the intruder.

6. The method of claim 1 further comprising:
determining whether a value of a counter is greater than a preset threshold; and
when the value of the counter is greater than the preset threshold terminating a current round of alarm triggering, recording the first trigger position for the current round, and transmitting data related to the first trigger position for display within a window on a user interface device.

7. A system comprising:
a smart microwave sensor module; and
a microprocessor unit coupled to the smart microwave sensor module,
wherein the microprocessor unit samples first signal data from the smart microwave sensor module to detect a presence of an object or an intruder, uses the first signal data to calculate a first velocity of the object or the intruder, uses the first signal data to calculate a first distance between the smart microwave sensor module and the object or the intruder, determines whether the first velocity is within a predefined range, and uses the first distance to determine whether the object or the intruder is within a designated protection territory,
wherein, when the first velocity is within the predefined range and the first distance indicates the object or the intruder is within the designated protection territory, the microprocessor unit records a first trigger position of the object or the intruder indicative of a current position of the object or the intruder when the first signal data was sampled, and
wherein the microprocessor unit samples second signal data from the smart microwave sensor module to detect the presence of the object or the intruder, uses the second signal data to calculate a second velocity of the object or the intruder, uses the second signal data to calculate a second distance between the smart microwave sensor module and the object or the intruder, determines whether the second velocity is within a predefined range, and uses the second distance to determine whether the object or the intruder is within the designated protection territory, and wherein, when the second velocity is within the predefined range and the second distance indicates the object or the intruder is within the designated protection territory, the microprocessor unit records a second trigger position of the object or the intruder indicative of the current position of the object or the intruder when the second signal data was sampled and generates an intrusion track route between the first trigger position and the second trigger position to identify a path for the object or the intruder between the first trigger position and the second trigger position.

8. The system of claim 7 wherein the microprocessor unit displays a rendering of the first trigger position, the second trigger position, and the intrusion track route on a user interface device.

9. The system of claim 8 wherein the microprocessor unit receives user input confirming the presence of the object or the intruder.

10. The system of claim 8 wherein the rendering is displayed within a window on the user interface device depicting the designated protection territory.

11. The system of claim 7 further comprising:
a passive infrared sensor module,
wherein the passive infrared sensor module transmits a wake up signal to the smart microwave sensor module or the microprocessor unit with instructions to exit a low power sleep state prior to the microprocessor unit sampling the first signal data and the second signal data from the smart microwave sensor.

12. The method of claim 1 wherein the microprocessor unit receives a work mode selection and, responsive thereto, samples the first signal data from the smart microwave sensor module to detect the presence of the object or the intruder.

13. The method of claim 1 wherein the microprocessor unit determines whether a value of a counter is greater than a preset threshold and, when the value of the counter is greater than the preset threshold, terminates a current round of alarm triggering, records the first trigger position for the current round, and transmits data related to the first trigger position for display within a window on a user interface device.

* * * * *